United States Patent [19]

Dietrich

[11] Patent Number: 5,068,721
[45] Date of Patent: Nov. 26, 1991

[54] PROCESS AND APPARATUS FOR THE REMOTE-CONTROLLED POSITIONING OF AN INSPECTION DEVICE WITH THE AID OF A TELEVISION CAMERA ASSOCIATED WITH THE INSPECTION DEVICE

[75] Inventor: Alban Dietrich, Hassloch, Fed. Rep. of Germany

[73] Assignee: ABB Reaktor GmbH, Mannheim, Fed. Rep. of Germany

[21] Appl. No.: 584,757

[22] Filed: Sep. 18, 1990

[30] Foreign Application Priority Data

Sep. 18, 1989 [DE] Fed. Rep. of Germany ....... 3931080

[51] Int. Cl.$^5$ ............................................. H04N 7/18
[52] U.S. Cl. ..................................... 358/100; 376/248
[58] Field of Search .................. 358/100, 108, 93, 229, 358/110, 107, 210, 106, 101, 87; 180/167; 376/245, 248, 249; 382/8, 30; 356/380

[56] References Cited

U.S. PATENT DOCUMENTS

| 3,267,794 | 8/1966 | Howe | 358/100 X |
| 3,465,145 | 9/1969 | Leiter | 358/110 X |
| 4,255,762 | 3/1981 | Takeyasu et al. | 376/248 X |
| 4,467,212 | 8/1984 | Olcott | 358/106 X |
| 4,560,931 | 12/1985 | Murakami et al. | 358/100 X |

Primary Examiner—Victor R. Kostak
Attorney, Agent, or Firm—Herbert L. Lerner; Laurence A. Greenberg

[57] ABSTRACT

In order to achieve a precise and time-saving positioning of an inspection device with the aid of a television camera associated with the inspection device, in a process and an apparatus for the remote-controlled positioning according to the invention, the television camera and the inspection device are disposed parallel to each other at a predeterminable distance and one above the other along an axis of symmetry. An internal, inherent or self marking for the television camera is aligned with a marking of the object under inspection. The television camera and the inspection device are displaced together along the axis of symmetry by the predetermined distance.

11 Claims, 4 Drawing Sheets

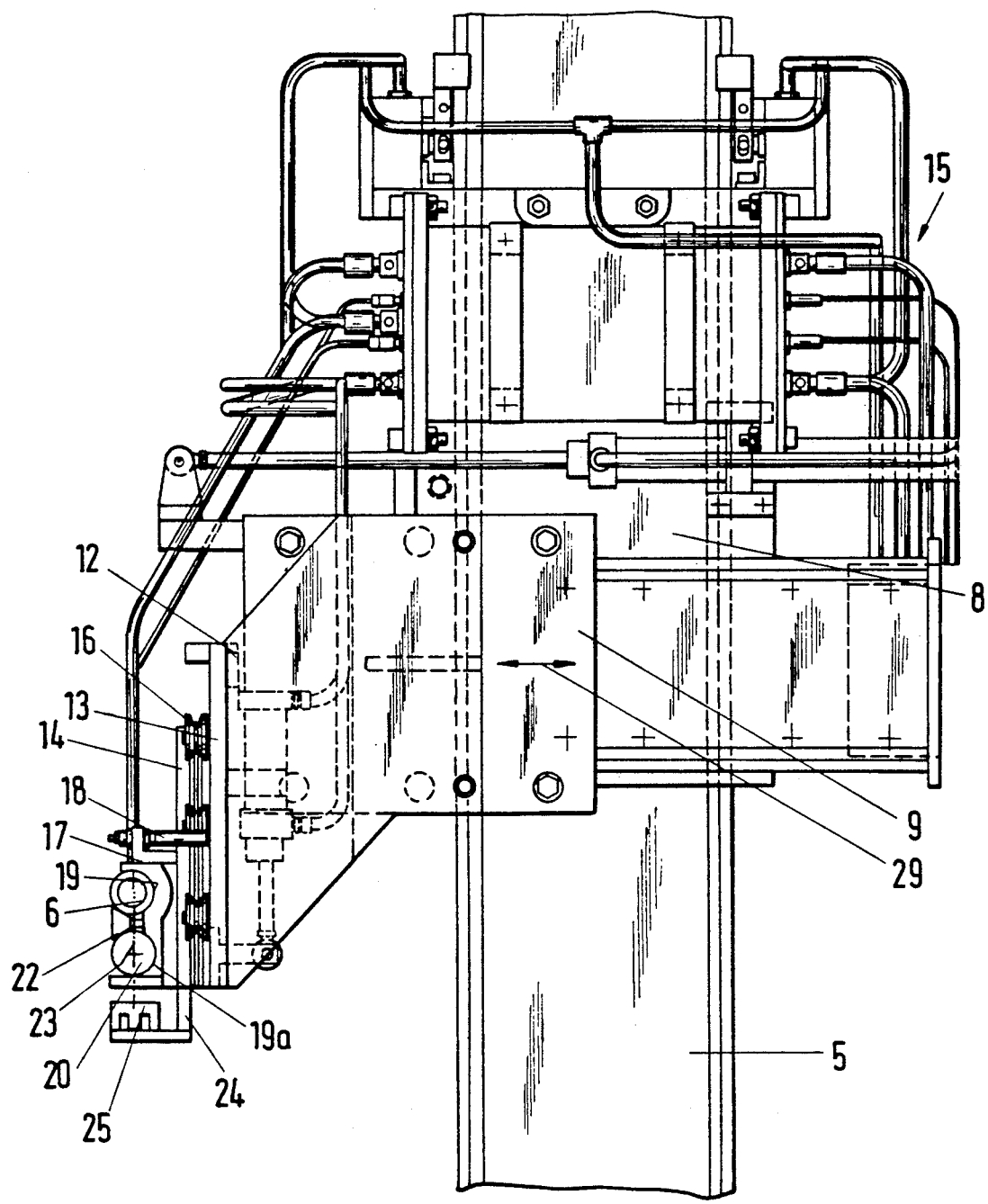

PROCESS AND APPARATUS FOR THE REMOTE-CONTROLLED POSITIONING OF AN INSPECTION DEVICE WITH THE AID OF A TELEVISION CAMERA ASSOCIATED WITH THE INSPECTION DEVICE

BACKGROUND OF THE INVENTION

1. Field of the Invention

The invention relates to a process and an apparatus for the remote-controlled positioning of an inspection device with the aid of a television camera associated with the inspection device, by executing travelling movements of a carriage carrying the television camera and the inspection device.

2. Description of the Related Art

Heretofore, two television cameras have been directed at the inspection head from the side in order to position the inspection device which may, for example, be an ultrasonic inspection head for the inspection of nuclear reactor components disposed in a water pool. The inspection head and the television cameras are moved until the object to be inspected and the inspection head arrive in the receiving area of a camera. Due to the inclined viewing angle of the cameras, the desired inspection position of the inspection device with respect to the object under inspection is can only be inaccurately determined.

It is accordingly an object of the invention to provide a process and an apparatus for the remote-controlled positioning of an inspection device with the aid of a television camera associated with the inspection device, which overcome the hereinafore-mentioned disadvantages of the heretofore-known methods and devices of this general type and which ensure a precise and time-saving positioning.

SUMMARY OF THE INVENTION

With the foregoing and other objects in view there is provided, in accordance with the invention, a process for the remote-controlled positioning of an inspection device with a television camera associated with the inspection device, which comprises positioning the television camera and the inspection device parallel to each other at a given spacing and one above the other along an axis of symmetry on a carriage, moving the carriage until an inherent, internal, self or own marking of the television camera is aligned with a marking of an object under inspection, and moving the carriage until the television camera and the inspection device are displaced together by the given distance along the axis of symmetry.

While observing a monitor connected to the camera, the marking of the camera is centered on the object. After achieving centering, the camera is then directed perpendicularly at the object, so that this operation can be carried out precisely. A precise positioning of the inspection device relative to the object takes place by moving the common carrier through the specified distance along the axis of symmetry. Camera surveillance is no longer necessary in this operation. Reliable inspection of the object depends on a precise positioning of the inspection device.

With the objects of the invention in view there is also provided an apparatus for the remote-controlled positioning of an inspection device with a television camera associated with the inspection device by travelling movements of an inspection device carriage carrying the television camera and the inspection device, comprising a carrier being fastened on the inspection device carriage and having recesses or clearances formed therein being adapted to contours of the television camera and the inspection device, and a clamping piece disposed between and spanning the television camera and the inspection device.

With the objects of the invention in view there is furthermore provided an apparatus for the remote-controlled positioning of an inspection device with a television camera, associated with the inspection device by travelling movements of a carriage carrying the television camera and the inspection device, comprising an internal, inherent, self or own marking of the television camera being adapted to a contour of an object under inspection. As a result, a precise activation of the camera is facilitated.

In accordance with another feature of the invention, there are provided means for moving the inspection device in an axial direction relative to the television camera.

It is thereby ensured with the use of a common carrier that the camera can maintain the necessary distance for achieving a good picture quality and the inspection device can perform its inspection tasks by approaching the object under inspection.

In accordance with a concomitant feature of the invention, there is provided a stationary guidance part disposed on the inspection device carriage, a console being associated with the stationary guidance part and extending underneath the carrier, a light source, and a mirror disposed on the console opposite the light source. This is done in order to achieve a deflection and concentration of the light beams in a simple way.

Other features which are considered as characteristic for the invention are set forth in the appended claims.

Although the invention is illustrated and described herein as embodied in a process and apparatus for the remote-controlled positioning of an inspection device with the aid of a television camera associated with the inspection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a fragmentary, elevational view taken in the direction of an arrow III in FIG. 2.

DESCRIPTION OF THE PREFERRED EMBODIMENTS

Figure 1:
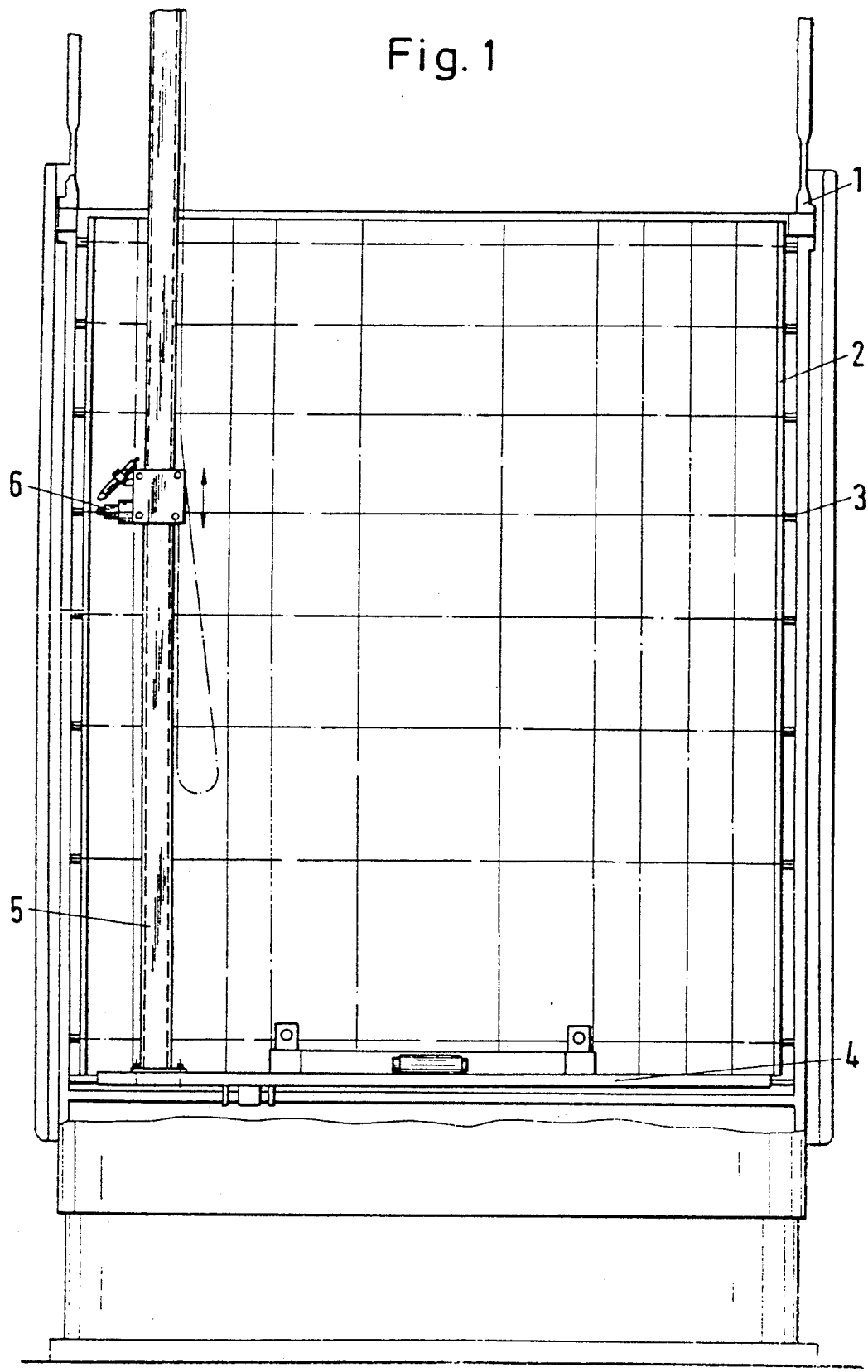
FIG. 1 is a fragmentary, diagrammatic, partly broken-away, longitudinal-sectional view of a core shroud of a water-cooled nuclear reactor plant with an inspection device.
Figure 2:
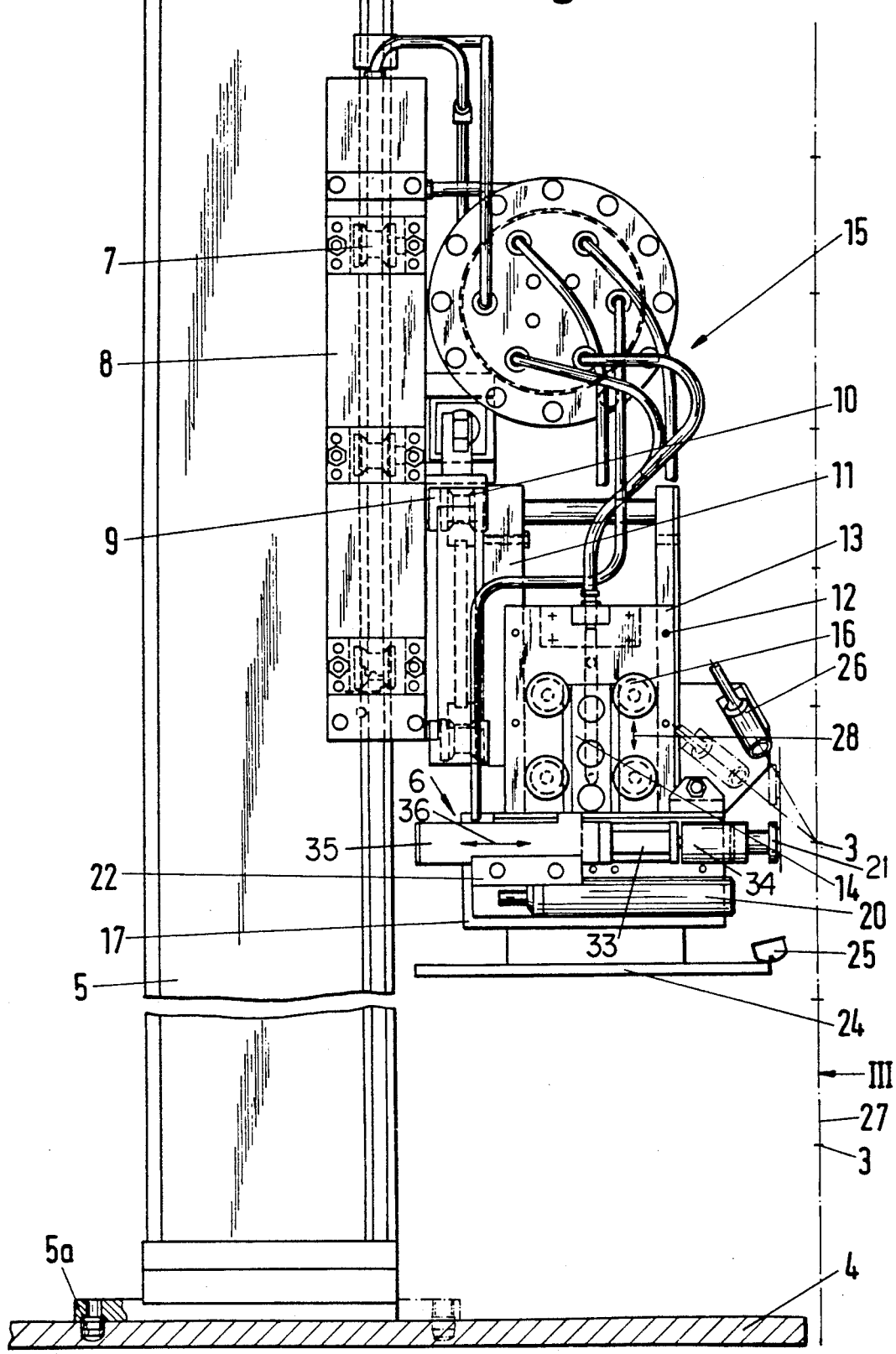
FIG. 2 is a fragmentary, longitudinal-sectional view of the apparatus on an enlarged scale.

Referring now to the figures of the drawings in detail and first, particularly, to FIG. 1 thereof, there is seen a a partial region of a core structure 1 of a water-cooled nuclear reactor plant. The core structure receives a core shroud or barrel 2, the periphery of which is matched to a composite structure of non-illustrated fuel assemblies. Therefore, as viewed in cross-section, the core shroud has a multiplicity of bent-out portions. In the vicinity of each bent-out portion, the core shroud is fastened to the core structure 1 by screws 3. In order to inspect screws, which are the objects under inspection, a support plate 4 is disposed on the bottom of the core structure and a mast 5 is supported thereon. At the same time, centering bolts 5a, which are fastened to the mast 5 as shown in FIG. 2, engage in corresponding recesses formed in the support plate 4. The non-illustrated top end of the mast may be held by a hoist. An inspection device 6 can move along the mast for the inspection of the screws 3.

FIGS. 2 and 3, which are drawn on an enlarged scale, show a longitudinal carriage 8 which is associated with the mast 5, can be moved in the axial direction of the mast by means of rollers 7 and carries a transverse carriage 9 which can be displaced by means of rollers 10. A guidance part 13 of an inspection device carriage 14, which can move perpendicularly to the transverse carriage 9, is fastened by means of a screw connection 12 to a frame 11 connected to the transverse carriage 9. The movement control of the carriages 8, 9, 14 is performed through control lines 15 The guidance part 13 also carries rollers 16, which are movable along the length of the inspection device carriage 14. A carrier 17 is rigidly connected to the guidance part 13 by means of a stay bolt 18. The carrier 17 has recesses 19, 19a formed therein which are adapted to the contours of the components to be received therein, namely a television camera 20 and the inspection device 6. A clamping piece 22, which is screwed to the carrier 17, holds the television camera and the inspection device, which is an ultrasonic inspection head 21 in the exemplary embodiment, in a rigid position with respect to each other. As can be seen in FIG. 2, the television camera and the inspection device are disposed parallel to each other, maintaining a center-to-center distance of 50 mm. FIG. 3 shows that the television camera and inspection device are also disposed vertically one above the other on a common axis of symmetry 23. The axis of symmetry 23 runs parallel to the direction of movement of the inspection device carriage 14. A console 24, which is disposed underneath the television camera 20 and carries a mirror 25 at an end thereof facing the lens of the television camera, is also connected to the guidance part 13. The mirror serves the purpose of concentrating light rays emanating from a light sources 26 fastened to the guidance part 13.

Figure 4A:
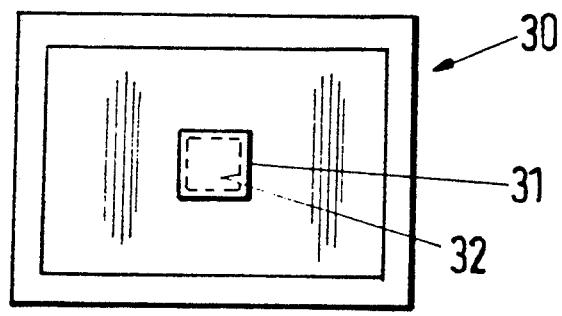
FIGS. 4a and 4b are elevational views of a monitor with pictures being cut out from a camera setting.
Figure 4B:
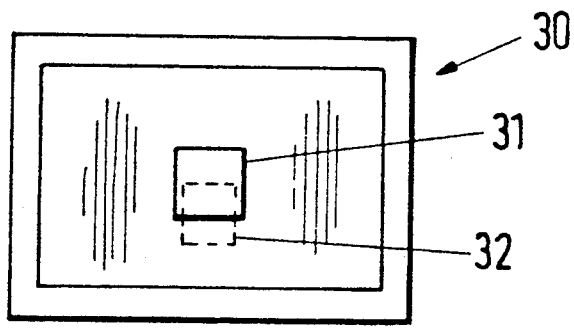

A dot-dashed line 27 indicates a wall part of the core shroud 2 and a fastening screw 3 is indicated at the end of a bundle of rays of the light sources 26. If the inspection device 6 is to be brought into the inspection position represented in FIG. 2, the inspection device carriage 14 has to be moved in the direction of an arrow 28 and the transverse carriage 9 has to be moved in the direction of an arrow 29, until an alignment of a square marking 31 integrated in the television camera with a square head 32 of the fastening screw 3 has occurred on a monitor 30 according to FIG. 4a. The contour of the marking 31 in this case corresponds to the contour of the square head. In FIG. 4b, for the sake of clarity, the marking 31 and the square head 32 of the fastening screw 3 are represented in the phase before alignment is achieved. As soon as the contours are brought into line, i.e. when the axis of the camera forms an imaginary extension of the axis of the fastening screw 3, the task of the camera 20 has been fulfilled. The positioning of the inspection device 6 is then performed by simple movement of the inspection device carriage 14 in the direction of the arrow 28 shown in FIG. 2 by the specified distance between the axes of television camera 20 and inspection device 6, which is given as 50 mm in the exemplary embodiment.

The ultrasonic inspection head 21 facing the object under inspection can be moved relative to a carrier part 35 of the inspection device 6 (which is held stationary by the clamping piece 22) in the direction of a arrow 36 by means of a guide rod 33 together with a rotary drive 34, effecting a rotation of the ultrasonic inspection head about its axis.

I claim:

1. Process for the remote-controlled positioning of an inspection device with a television camera associated with the inspection device, which comprises positioning the television camera and the inspection device parallel to each other at a given spacing and one above the other along an axis of symmetry on a carriage, moving the carriage until a marking on the television camera is aligned with a marking of an object under inspection, and moving the carriage until the television camera and the inspection device are displaced together by the given spacing along the axis of symmetry.

2. Apparatus for the remote-controlled positioning of an inspection device with a television camera associated with the inspection device by travelling movements of an inspection device carriage carrying the television camera and the inspection device, comprising a camera being fastened on the inspection device carriage and having recesses formed therein being adapted to contours of the television camera and the inspection device, and a clamping piece disposed between and spanning the television camera and the inspection device.

3. Apparatus according to claim 2, including means for moving the inspection device in a direction parallel to the axis of the television camera.

4. Apparatus according to claims 2, including a stationary guidance part disposed on the inspection device carriage, a console associated with said stationary guidance part and extending underneath said carrier, a light source disposed on said guidance part, and a mirror disposed on said console opposite said light source.

5. Apparatus according to claim 2, including a marking on the television camera adapted to a contour of an object under inspection, a stationary guidance part disposed on the inspection device carriage, a console associated with said stationary guidance part and extending underneath said carrier, a light source disposed on said guidance part, and a mirror disposed on said console opposite said light source.

6. Apparatus according to claim 5, including means for moving the inspection device in a direction parallel to the axis of the television camera.

7. Apparatus according to claim 2, including a marking in the television camera adapted to a contour of an object under inspection, a stationary guidance part disposed on the inspection device carriage, a console associated with said stationary guidance part and extending underneath said carrier, a light source disposed on said guidance part, and a mirror disposed on said console opposite said light source.

8. Apparatus according to claim 7, including means for moving the inspection device in a direction parallel to the axis of the television camera.

9. Apparatus for the remote-controlled positioning of an inspection device with a television camera, associated with the inspection device by travelling movements of a carriage carrying the television camera and the inspection device, comprising a marking on the television camera being adapted to a contour of an object under inspection.

10. Process for the remote-controlled positioning of an inspection device with a television camera associated with the inspection device, which comprises positioning the television camera and the inspection device parallel to each other at a given spacing and one above the other along an axis of symmetry on a carriage, moving the carriage until a marking in the television camera is aligned with a marking of an object under inspection, and moving the carriage until the television camera and the inspection device are displaced together by the given spacing along the axis of symmetry.

11. Apparatus for the remote-controlled positioning of an inspection device with a television camera, associated with the inspection device by travelling movements of a carriage carrying the television camera and the inspection device, comprising a marking in the television camera being adapted to a contour of an object under inspection.

* * * * *